Oct. 30, 1934.   H. R. GIBBONS   1,978,707

BEARING

Filed June 29, 1931

ARCS ECCENTRIC
LARGE CLEARANCE

LOAD ZONE SMALL

RACE ROUND

CLEARANCE

ARCS COINCIDE
NO CLEARANCE
LARGE LOAD ZONE

RACE DEFLECTED

CLEARANCE CONCENTRATED
ON UNLOADED SIDE

INVENTOR:
HAROLD R. GIBBONS,
BY Gales P. Moore
HIS ATTORNEY.

Patented Oct. 30, 1934

1,978,707

UNITED STATES PATENT OFFICE 1,978,707

BEARING

Harold R. Gibbons, Chatham, N. J., assignor to General Motors Corporation, Detroit, Mich., a corporation of Delaware Application June 29, 1931, Serial No. 547,537

5 Claims. (Cl. 308—180)

This invention relates to bearings and comprises all of the features of novelty herein disclosed, by way of example, in connection with a roller bearing. An object of the invention is to provide an improved bearing construction which will not only have the desired clearances for assembly, lubrication, etc. but will also maintain the loaded portions of its raceways substantially concentric. Another object is to produce an improved bearing construction which will provide a large load zone and so increase the bearing capacity. Another object is to provide an improved bearing having a tendency to distribute external load on its loaded rolling elements uniformly and from the beginning of the application of the external load. Still another object is to provide an improved method of increasing the load zone of a bearing.

To these ends and to improve generally upon devices of this character, the invention also consists in the various matters hereinafter described and claimed. In its broader aspects, the invention is not necessarily limited to the specific construction selected for illustrative purposes in the accompanying drawing in which Fig. 1 is a longitudinal section through a journal box.

Figure 1:
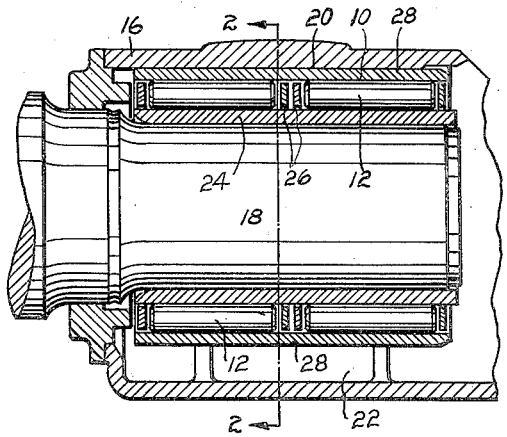
Figure 2:
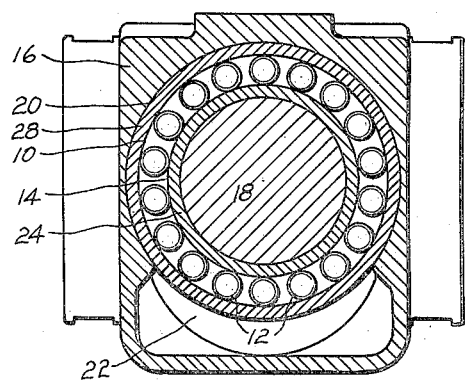
Fig. 2 is a sectional view on line 2—2 of Fig. 1.
Figure 3:
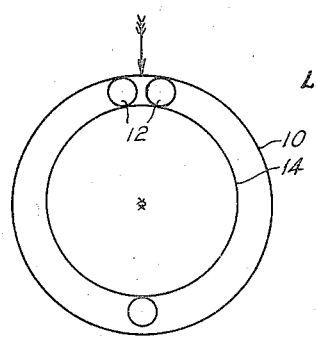
Fig. 3 is a diagrammatic view of prior constructions.

In the usual antifriction bearing comprising an inner race ring, an outer race ring, and an interposed series of rolling elements, the load is carried by comparatively few of the rolling elements at the loaded side of the bearing. This restriction of the load zone is due to the clearances which are needed for assembly, lubrication, manufacturing tolerances, etc. For example, the annular roller space is made a little larger than the annular volume of the series of rollers or, in other words, the difference in radii of the two races is made greater than the roller diameter. As a result, the race rings are not concentric when the bearing is in use. This is illustrated in Fig. 3. If a load is acting downwardly in the direction of the arrow from the outer race surface 10 to the rolling elements 12 and thence to the inner race surface 14, the usual clearances allow the outer race surface to approach the inner race surface at the loaded side while the outer race surface recedes from the inner race surface at the unloaded side. The rings thus become eccentric, the center of the outer race surface being lower than the center of the inner race surface. The resulting eccentricity of race surfaces is such that the smallest space between the races is at the top and increases towards the sides and bottom. Hence the two uppermost rollers (or one of the uppermost rollers in an alternative position) first receive the load and only by compression of rollers or races can the load zone spread to transfer some load to other rollers.

The present invention is shown applied, by way of example, to a railway journal box or housing 16 which receives the weight of the car in any suitable way and transfers it to an axle or shaft 18. The housing has an arcuate bore 20 which is shown extended for more than 180° around the upper half of the shaft, the bottom of the housing being relieved or cut away as at 22. The interruption or cut-away part is useful as a lubricant reservoir but has another very important effect which will appear. The shaft 18 may itself form an inner raceway but it is preferred to cover it with a separate race ring or sleeve 24 whose outer race surface 14 engages the rolling elements 12. The rolling elements are herein shown as cylindrical rollers in two circulars series but this is not essential. Each series of rolling elements preferably has a suitable cage or separator whose end rings are indicated at 26, the separator being removed in the end view.

Pressed into the interrupted bore 20 of the housing is an outer race ring or sleeve 28 having a race surface 10. The initial radius of surface 10 is greater than the radius of the surface 14 by an amount which is greater than the roller diameter, this for the purpose of providing the aforementioned clearances for assembly, etc. The sleeve 28 is sufficiently thin to be flexible or yielding and its external diameter is greater, by a small amount, than that of the interrupted bore 20. When such a sleeve is pressed into a round bore which is too small for it and also interrupted for a considerable angular distance, the sleeve becomes slightly elliptical with its major axis bisecting the interruption.

Figure 4:
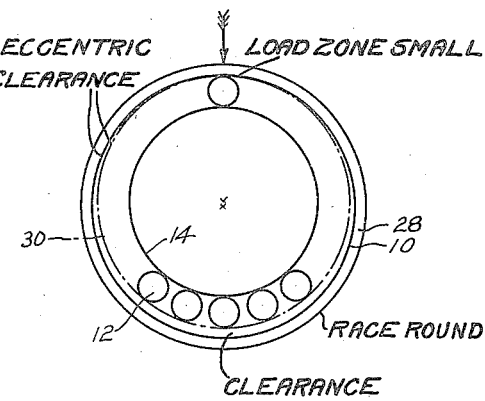
Figs. 4 and 5 are diagrammatic views, with certain features exaggerated to illustrate the present invention.
Figure 5:
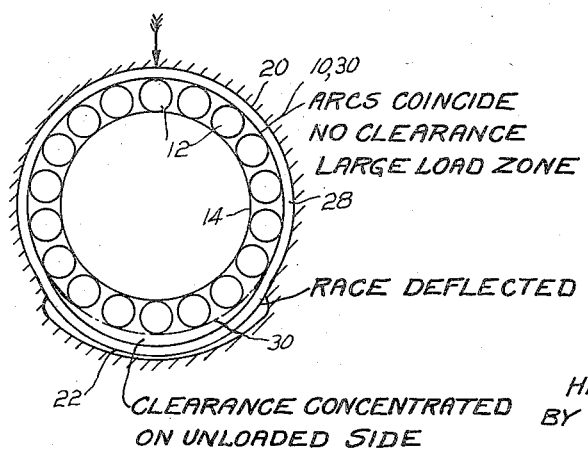

The result of this construction is indicated diagrammatically in exaggerated degree in Figs. 4 and 5, the circle 30 indicating an imaginary surface which will just surround or envelope the series of rolling elements when the latter are in engagement with the inner raceway 14. This circle is of course concentric with the inner raceway. The sleeve 28 which is initially cylindrical as indicated in Fig. 4, and larger internally than the circle 30, is squeezed or contracted laterally by the housing side walls as indicated in Fig. 5 and the upper portion of its race surface 10 is made to approach very closely to the upper portion of the circle 30. The upper portions of the two surfaces become substantially concentric arcs having the same radius. Thus a load acting in the direction of the major axis of the ellipse is transmitted directly to a comparatively large number of rollers (without requiring deflection of the rollers or of the housing by the external load) and the load zone is thus materially increased. Assembly is nevertheless easy because the clearance at the unloaded side is increased when the clearance at the loaded side is diminished. In assembling, the outer race ring is pressed axially into the housing, the roller assembly is slid into the elliptic outer race ring at the low part of the space, then housing and roller assembly (raised into alignment with the shaft) are slipped over the shaft and its inner race ring. The housing is then lowered until the upper portion of the race surface 10 rests on the rollers.

It will be noted that the invention concerns itself largely with the close fit of the rollers at the loaded side of the outer race surface which is forced into concentricity with the roller assembly before external load is applied. Then as external load is applied, all or many of the rollers at the loaded side begin to receive the load at once without being dependent on a prior compression by the external load. Thus there is a tendency from the beginning to distribute the load on the rollers uniformly. Otherwise stated, the invention utilizes the principle that a circle slightly larger than another can be squeezed into an ellipse which will have a portion essentially arcuate and of very nearly the same radius as such smaller circle. In this case, one circle or arc is that which just envelopes a circular series of rolling elements in running position and the other or shorter arc is on an elliptical outer race ring. The two arcs become concentric on the loaded side and in so doing cause clearances to increase or accumulate on the unloaded side. The housing is not constructed to yield or deflect although a slight inherent spring in its side walls does no harm and improves the fit with the outer race ring. Without limiting the invention in any way and to illustrate the importance of small quantities it may be stated that, using usual bearing materials and proportions, an outer race ring will receive a suitable deflection to give great increase in load zone if pressed into an interrupted bore which is from two to six thousandths of an inch too small for it, such tolerances prevailing when the two diameters are about eight and one-half inches. The bore 20 is preferably more than 180° in extent and the interruption is a supplementary angle less than 180°. This insures the retention of the race ring 28 in its deflected position. The interruption can be located at any part of the circle and is preferably directly opposite to the direction of applied load. The deflected portion of the race ring also locks the ring from rotation.

I claim:

1. In a bearing, an outer race ring, an inner race ring, a circular series of rolling elements between the rings, the outer race surface being initially circular with a radius exceeding the radius of the inner race surface by an amount greater than the diameter of a rolling element, and positive means independent of the load on the bearing for permanently holding one of the race rings deflected into non-circular shape; substantially as described.

2. In a bearing, an outer race ring, an inner race ring, a circular series of rolling elements between the rings, a substantially rigid housing having an interrupted bore whose radius is smaller than the radius of the outer race ring, and positive means for holding the outer race ring in a deflected position in the bore prior to application of an external load; substantially as described.

3. In a bearing, an outer race ring, an inner race ring, a circular series of rolling elements between the rings, a housing having an interrupted bore whose radius is always smaller than the radius of the outer race ring, the bore extending around the outer race ring for more than 180° and the wall thereof being substantially rigid to thereby positively lock the outer race ring in a deflected position therein; substantially as described.

4. In a bearing, an outer race ring, an inner race ring, a circular series of rolling elements between the rings, a housing having an interrupted bore whose radius is smaller than the radius of the outer race ring, and positive means independent of the load on the bearing for deflecting the outer race ring into a generally elliptical shape with the major axis substantially bisecting the interrupted portion of the bore; substantially as described.

5. In a bearing, an inner race ring, a yieldable outer race ring, a series of rolling elements between the rings, a housing provided with a rigid seat having an arcuate surface of smaller radius than the radius of the outer race ring, the seat extending around more than half of the circumference of the race ring to hold the ring laterally contracted with its loaded side concentric with the inner race ring, and the housing having an interruption between the terminals of the seat to receive a deflected portion of the outer race ring; substantially as described.

HAROLD R. GIBBONS.